(12) United States Patent
Ercan et al.

(10) Patent No.: US 11,458,803 B2
(45) Date of Patent: Oct. 4, 2022

(54) DEVICE FOR DETERMINING A TEMPERATURE IN A PASSENGER COMPARTMENT OF A VEHICLE

(71) Applicant: Airbus Operations GmbH, Hamburg (DE)

(72) Inventors: Ayse Ercan, Hamburg (DE); Kemal-Edip Yildirim, Hamburg (DE); Viktor Bader, Hamburg (DE); Ingo Gores, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 201 days.

(21) Appl. No.: 16/658,952

(22) Filed: Oct. 21, 2019

(65) Prior Publication Data
US 2020/0130462 A1   Apr. 30, 2020

(30) Foreign Application Priority Data
Oct. 24, 2018   (DE) .......................... 102018126484.4

(51) Int. Cl.
    *B60H 1/00*   (2006.01)
(52) U.S. Cl.
    CPC ..... *B60H 1/00742* (2013.01); *B60H 1/00807* (2013.01)
(58) Field of Classification Search
    CPC .................. B60H 1/00742; B60H 1/00807
    See application file for complete search history.

(56) References Cited

U.S. PATENT DOCUMENTS 6,021,956 A * 2/2000 Haraguchi ......... B60H 1/00742
                                                              236/51
6,202,934 B1    3/2001 Kamiya et al.
(Continued)

FOREIGN PATENT DOCUMENTS

DE          19921518 A1    11/2000
DE       102008037815 A1     3/2009
(Continued)

OTHER PUBLICATIONS

German Search Report; priority document.
(Continued)

*Primary Examiner* — Aniss Chad
*Assistant Examiner* — Jennifer M Anda
(74) *Attorney, Agent, or Firm* — Greer, Burns & Crain, Ltd.

(57) ABSTRACT

A device for determining a temperature in a passenger compartment of a vehicle comprising a sensor unit for detecting infra-red radiation and a temperature determining unit. The temperature determining unit may be configured so as, in dependence upon the measurement data provided by the sensor unit, to determine a surface temperature of a predetermined object located in the vehicle passenger compartment and, from the determined surface temperature of the object using a first functional relationship, to determine an air temperature in the vehicle passenger compartment. The temperature determining unit may be configured as an alternative or in addition thereto so as, in dependence upon the measurement data provided by the sensor unit, to determine a surface temperature for at least one passenger compartment occupant, and from the determined surface temperature using a second functional relationship to determine a measurement for the level of personal comfort.

9 Claims, 7 Drawing Sheets

(56) References Cited

U.S. PATENT DOCUMENTS

| | | | |
|---|---|---|---|
| 2013/0255930 A1 | 10/2013 | Prakah-Asante et al. | |
| 2014/0148706 A1* | 5/2014 | Van Treeck | A61B 5/0077 600/474 |
| 2016/0311292 A1* | 10/2016 | Park | B60H 1/0075 |
| 2017/0334263 A1* | 11/2017 | Schumacher | B60N 2/56 |
| 2018/0195911 A1* | 7/2018 | Kakade | G01K 13/02 |

FOREIGN PATENT DOCUMENTS

| | | |
|---|---|---|
| DE | 102011077522 A1 | 12/2012 |
| DE | 102014224489 A1 | 6/2016 |
| EP | 2030817 A2 | 3/2009 |
| JP | 6618450 B2 * | 12/2019 |
| KR | 20100125596 A * | 12/2010 |

OTHER PUBLICATIONS

Ergonomie der thermischen Umgebung—Beurteilung der thermischen Umgebung in Fahrzeugen—Teil 2: Bestimmung der Aquivalenttemperatur (ISO 14505-2:2006); Deutsche Fassung EN ISO 14505-2:2006.

Ergonomie der thermischen Umgebung—Beurteilung der thermischen Umgebung in Fahrzeugen—Teil 2: Bestimmung der Aquivalenttemperatur (ISO 14505-2:2006); Deutsche Fassung EN ISO 14505-2:2006, Berichtigungen zu DIN EN ISO 14505-2:2007-04.

European search report from corresponding European application No. 19204362.8 dated Mar. 4, 2020.

\* cited by examiner

DEVICE FOR DETERMINING A TEMPERATURE IN A PASSENGER COMPARTMENT OF A VEHICLE

CROSS-REFERENCES TO RELATED APPLICATIONS

This application claims the benefit of the German patent application No. 102018126484.4 filed on Oct. 24, 2018, the entire disclosures of which are incorporated herein by way of reference.

FIELD OF THE INVENTION

The invention relates to a device for determining a temperature in a passenger compartment of a vehicle having a sensor unit for detecting infra-red (IR) radiation, by way of example an IR camera and/or a thermal imaging camera.

BACKGROUND OF THE INVENTION

In recent times, the optimization of the climatic conditions in vehicles has been considered with ever-increasing development costs. Modern motor vehicles often have a complicated temperature control system with regard to the distribution and arrangement of the seats. Different air, heating and temperature control ducts may be opened and closed or are controlled by means of a so-called "automated temperature control system." In dependence upon the velocity of the vehicle, upon the number of occupants, upon the solar radiation, external temperature, vehicle velocity, use of air filters and the like, the climatic conditions in such a compartment or compartment area drastically change within a very short time.

It is known from practice to measure the temperature of vehicle cabins intermittently using sensors and to control the temperature accordingly. It is a disadvantage of the known approaches that changes in the climatic conditions are not detected or are at least not sufficiently detected, by way of example inhomogeneities in the case of the temperature distribution in the cabin, in particular in the case of vehicles with a large internal volume, such as buses or aircraft, or asymmetries, for example as a result of solar radiation and stresses, as a result of which on one side the temperature is adjusted too hot and on the other side too cold.

Moreover, it is known from the prior art, for example DE 199 21 518 A1, to use an infra-red (IR) camera for the contactless determination of the temperature distribution in interior compartments of vehicles. However, it is a disadvantage of the known approaches that it is not possible using the camera to determine in a sufficiently precise manner the temperature of the interior compartment and the prevailing level of occupant comfort.

SUMMARY OF THE INVENTION

Accordingly, it is therefore an object of the invention to provide an improved technique, whereby the disadvantages of the known solutions may be avoided. In particular, it is an object of the invention to provide an improved and cost-efficient technique for determining in a more precise manner the air temperature in the passenger compartment and/or for determining the individual level of comfort being experienced by the occupants.

In accordance with general aspects of the invention, a device for determining a temperature in a passenger compartment of a vehicle is provided, in particular a device for the contactless determination of a temperature in a passenger compartment. The device comprises a sensor unit for detecting infra-red (IR) radiation, also described below as an IR sensor unit. The sensor unit may be configured as an IR camera and/or a thermal imaging camera. The sensor unit may also comprise multiple such IR cameras and/or thermal imaging cameras, which is advantageous, in particular, in passenger compartments that have a large internal volume, in order to be able to detect all the areas using the sensor unit. The sensor unit is preferably arranged in such a manner that it detects IR radiation of a passenger compartment of the vehicle.

The vehicle may be a motor vehicle, a passenger car or an omnibus. However, the vehicle may also be an airborne vehicle (aircraft) or a passenger train.

In accordance with a first embodiment, the device may comprise a temperature determining unit that is configured so as, in dependence upon the measurement data provided by the sensor unit, to determine a surface temperature of a predetermined object that is located in the passenger compartment of the vehicle and from the determined surface temperature of the object using a first functional relationship to determine an air temperature in the passenger compartment of the vehicle. In other words, the air temperature in the passenger compartment is determined in relation to a temperature of a predetermined object. Although it is possible with the aid of the IR sensor unit to measure temperatures of objects in the passenger compartment in a manner known per se, it is not however possible to measure air temperatures directly. Tests within the scope of the invention have however shown that the air temperature in the vicinity of an object may be calculated from the object temperature using a mathematical function, in this document also referred to as a first functional relationship. This first functional relationship may be determined experimentally in advance using test measurements and/or regression analyses and stored in the device, for example in the form of a characteristic curve, a formula or a so-called look-up table, which allocate to different object temperatures the air temperatures that are then prevailing in the vicinity of the object.

The object may be an interior object of the passenger compartment, preferably such interior objects or their areas, which lie in the cone of view of the IR sensor unit and normally are not concealed by occupants, such as, by way of example, an upper edge area or corner area of a passenger seat, an area of the internal cladding or a support or holding structure in the roof area. It is advantageous if always the same object or part of the object is always used as the reference point for the measurement of the object temperature in order to achieve the most precise possible results. In this sense, the object is to be predetermined.

The air temperature that is determined using the first functional relationship corresponds to an air temperature in the vicinity of the object, the temperature of which has been measured using the IR sensor unit.

In accordance with a possible first further development of the first embodiment, the temperature determining unit may be configured so as to detect inhomogeneities and/or asymmetries of a temperature distribution in the passenger compartment to determine the surface temperatures of predetermined objects in different areas of the passenger compartment and using the first functional relationship to determine therefrom respective air temperatures in the different areas of the passenger compartment. In other words, it is possible in accordance with this variant to measure the object temperature in different areas of the passenger compartment respectively using the IR sensor unit in order then to determine from the respective measured object temperatures the air temperature that is prevailing in the vicinity of the measured objects. In accordance with a further aspect, it is possible to use different mathematical correlations for the different areas and/or objects of the passenger compartment, whose air temperature is to be determined, in other words to use respective suitable first functional relationships between object temperature and air temperature, so as to determine the air temperature. By way of example, it is possible for each measuring site, in other words object, in one of the areas, to determine experimentally in advance the functional relationship between the object temperature and air temperature and to store this in the device. The precision of the determination of the air temperature can thereby be improved.

As an alternative or in addition thereto, it is possible in accordance with a second embodiment for the temperature determining unit to be configured so as, in dependence upon the measurement data provided by the sensor unit, to determine a surface temperature, preferably a face temperature and/or hand temperature, for at least one occupant of the passenger compartment, and from the determined surface temperature to determine by means of a second functional relationship a measurement for the level of personal comfort. A measurement for the level of personal comfort is understood to be a variable that indicates how comfortable or uncomfortable an occupant is or, in other words, how comfortable an occupant is with respect to the prevailing temperature of the internal compartment. The second functional correlation represents a mathematical correlation between the surface temperature of the occupant and the level of personal comfort.

The second functional relationship may be established such that an equivalent temperature is determined so as to determine the measurement for the level of personal comfort. An equivalent temperature of this type represents a very reliable measurement for the level of personal comfort. The equivalent temperature corresponds, in this case, to the temperature experienced by humans. The equivalent temperature is defined by way of example in the standard DIN EN ISO 14505-2—"Ergonomie der thermischen Umgebung—Beurteilung der thermischen Umgebung in Fahrzeugen—Teil 2: Bestimmung der Äquivalenttemperature" [Ergonomics of the thermal environment—Evaluation of thermal environments in vehicles—Part 2: Determination of equivalent temperature] and combines the air temperature, air velocity and thermal radiation to form a temperature index. By way of example, it is possible to determine an equivalent temperature of the face from the occupant's face temperature that has been determined using the IR sensor unit.

Within the scope of the invention, it has, however, been established that a mathematical correlation exists between the equivalent temperature of the face and the equivalent temperature of the whole body of the occupant and the mathematical correlation may be determined experimentally for a given passenger compartment. Accordingly, in accordance with a further aspect, it is moreover possible to determine an equivalent temperature of the whole body (whole body equivalent temperature) from the occupant's face temperature that has been determined using the IR sensor unit. In this case, the mathematical correlation and/or the mathematical relationship between the equivalent temperature of the face and the equivalent temperature of the whole body of the occupant may be such that the progression of this equipment temperature in an average temperature range that is considered by the occupant as pleasant are essentially identical. In the region of the transition from a pleasant temperature range into the temperature range that is considered too cold, the pleasant range for the equivalent temperature of the whole body does, however, decrease earlier in the direction of the colder range. This means, for example, that in this range for a given face surface temperature the equivalent temperature of the whole body is less that the equivalent temperature of the face. The same may apply for the region of the transition from the pleasant temperature range into the temperature range that is considered too warm.

In accordance with a possible further development of this second embodiment, the temperature determining unit may be configured so as, in dependence upon the measurement data provided by the sensor unit, to determine a surface temperature of an object that is located in the close vicinity of the occupant and to use the surface temperature as a correction value for determining the measurement for the level of personal comfort, for example, the equivalent temperature. This aspect is based on the knowledge that despite an identical surface temperature of an occupant, the level of personal comfort may be different, for example as a result of the effects of sweating or the effects of a delay in the object warming up in comparison to the surface temperature of the body, which may be corrected accordingly.

By way of example, the temperature determining unit may be configured so as, using the correction value, to take into consideration an effect according to which after exceeding a first compartment temperature threshold the surface temperature of an occupant no longer or slowly increases in the case of a further increase in the compartment temperature since the occupant increasingly loses heat by means of sweating.

As an alternative or in addition thereto, the temperature determining unit may be configured so as, using the correction value, to take into consideration an effect according to which after falling below a second compartment temperature threshold the surface temperature of an occupant no longer or slowly decreases in the case of a further reduction in the compartment temperature since the occupant increasingly creates heat by means of shivering.

Moreover, the second functional relationship may comprise a correction variable for the different values that are established depending upon the time of year. As a consequence, it is possible to take into consideration more precisely that the correlation between the surface temperature of an occupant and the level of the comfort of the occupant may be different depending upon the time of year. The first embodiment and the second embodiment are to be regarded as being disclosed both in combination with one another and also independently of one another.

Close vicinity may be an area that is less than 1 meter, preferably less than 0.5 meters, more preferably less than 0.25 meters, away from the site at which the surface temperature of the occupant is measured.

The second functional relationship and the magnitude of the correction value for correcting the sweating, the reduction of body temperature and/or the effects of the time of year may be determined by way of example again in advance within the scope of the test measurements, for example in that different temperature profiles of the passenger compartment are measured, and the surface temperature of the occupant is measured using test persons or measurement dolls, whereby conventional non-contactless temperature sensors are attached to the measuring sites on the test persons or measuring dolls, for example in the face or on the hand.

In accordance with a further aspect, the device may be configured so as, in dependence upon the measurement data provided by the sensor unit, to determine the number of occupants in the vehicle. In this case, it is possible to use accordingly algorithms for the image analysis, which from the data provided by the IR sensor unit, for example the IR camera, detects the silhouettes, surface shapes, or IR radiation profiles of the individual occupants, and determines therefrom the number of occupants.

In a further development of this aspect, the temperature determining unit may moreover be configured so as, in dependence upon the determined number of occupants, to determine the measurement for the level of personal comfort for each of the multiple occupants, preferably for all occupants.

Moreover, the invention relates to a vehicle having a device for determining a temperature of a passenger compartment, such as described in this document. It has already been mentioned above that the vehicle may be by way of example an aircraft, passenger car or an omnibus. The vehicle comprises moreover a temperature control system for controlling the temperature of the passenger compartment of the vehicle, comprising a temperature controller for controlling or regulating the compartment temperature of the passenger compartment. In this case, the compartment temperature of the passenger compartment is controlled or regulated by means of the temperature controller in dependence upon the output data provided by the temperature determining unit.

In accordance with one aspect, the vehicle may comprise a device in accordance with the first embodiment in the first further development. In this case, the temperature control system may be configured so as, in dependence upon the air temperatures that are determined for the different areas, to regulate or control the temperature control system specifically for the different areas. This opens up the possibility of taking into consideration the compartment temperature as a whole and to regulate the temperate of zones and to eliminate or reduce the inhomogeneities and asymmetries of the air temperature distribution in the passenger compartment. Moreover, this results in energy savings since the measures are used in a purposeful manner for each zone.

In accordance with a further aspect, the vehicle may comprise a device for determining a temperature in a passenger compartment of the vehicle, the device being configured so as, in dependence upon measured data provided by the sensor unit, to determine the number of occupants in the vehicle, as already described above. In this case, the temperature controller may be configured so as to control or regulate the compartment temperature in dependence upon the determined number of occupants, preferably only in those areas of the passenger compartment in which at least one occupant is located. As a consequence, a further energy saving is rendered possible since temperature control measures are used purposefully only in the areas in which occupants are located.

In accordance with a further aspect, the vehicle may comprise a device for determining a temperature in a passenger compartment of the vehicle, the device being configured so as, in dependence upon the determined number of occupants, to determine the measurement for the level of personal comfort for each of the multiple occupants, preferably for all occupants, as has already been described above. In this case, the temperature controller may be configured so as to regulate or control the temperature control system to suit the specific occupant in dependence upon the determined measurement of the level of personal comfort for the respective occupant. As a consequence, any possible discomfort being experienced by the occupants may be reduced by means of purposeful measures, in that the temperature is accordingly adjusted locally. As a consequence, a further energy saving is rendered possible since temperature control measures may be performed in a purposeful manner on an individual basis for individual occupants.

BRIEF DESCRIPTION OF THE DRAWINGS

The previously described aspects and features of the invention may be combined with one another in an arbitrary manner. Further details and advantages of the invention are described below with reference to the attached drawings. In the drawings.

Like or functionally equivalent elements are provided in all the figures with the same reference numerals and in part not especially described.

DETAILED DESCRIPTION OF THE PREFERRED EMBODIMENTS

Figure 1:
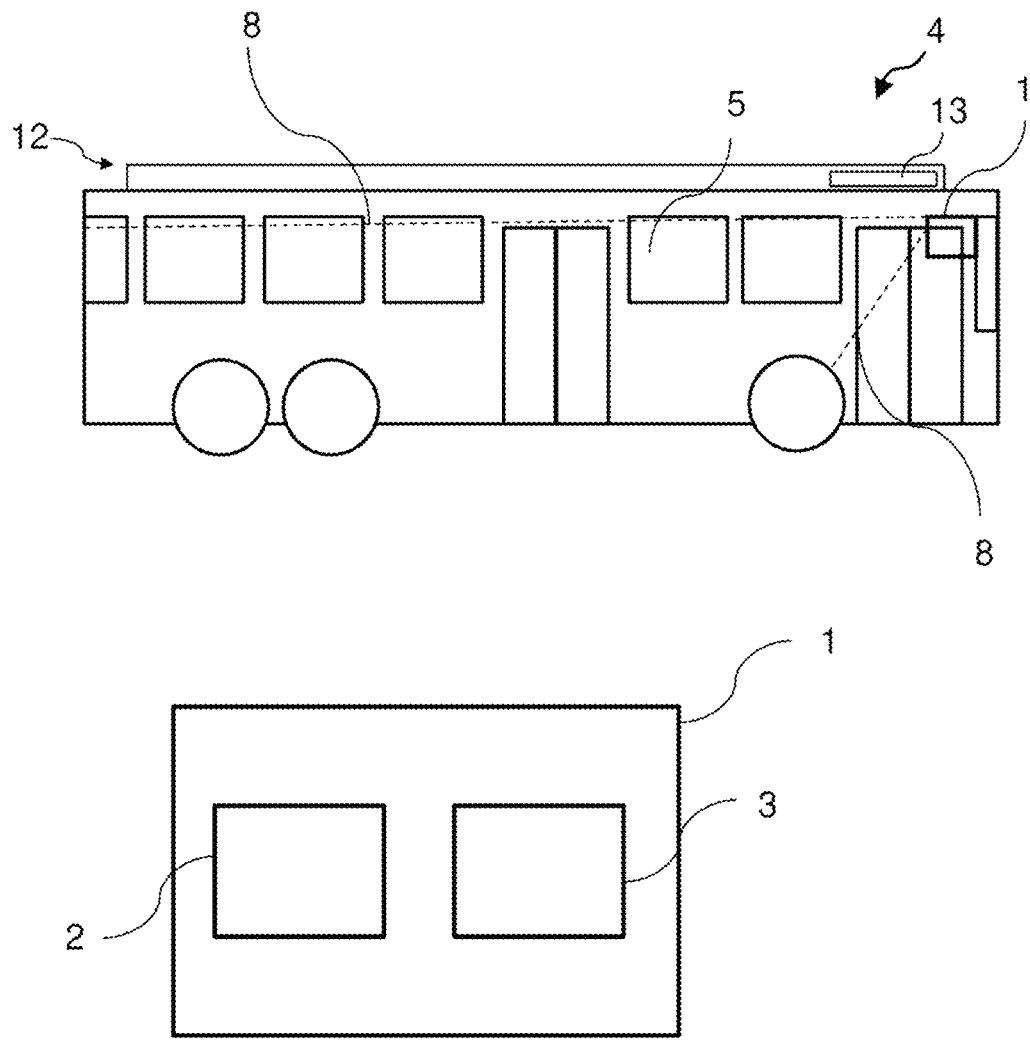
FIG. 1 illustrates a schematic view of a vehicle having a device for determining a temperature in a passenger compartment in accordance with an exemplary embodiment.
Figure 5:
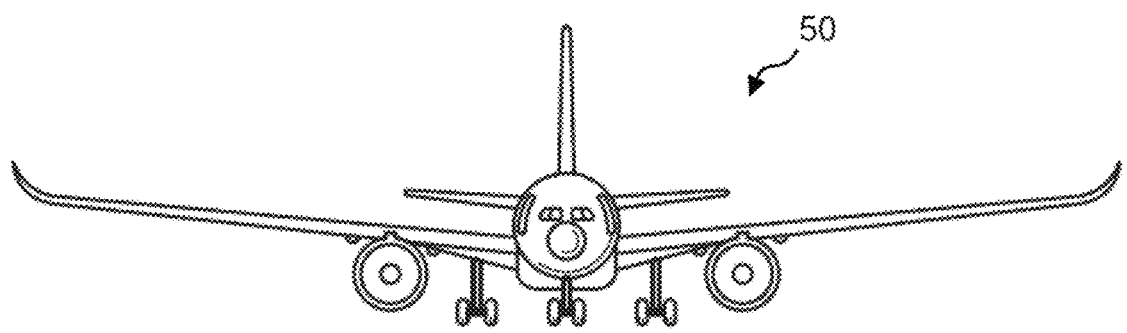
FIG. 5 illustrates a schematic view of an aircraft.

FIG. 1 illustrates in the upper part of FIG. 1 a vehicle 4 having a passenger compartment 5 in which a device 1 for determining a temperature of the passenger compartment 5 is arranged. The device 1 is illustrated again in the lower part of FIG. 1 in a separate greatly schematized view as a block diagram. The device 1 comprises, in this case, a sensor unit 2 for detecting infra-red (IR) radiation. The IR sensor unit 2 may be configured, by way of example, as an IR camera known per se and/or as a thermal imaging camera. The device 1 comprises moreover a temperature determining unit 3 that is configured so as, in dependence upon measurement data provided by the IR sensor unit 2, to determine an air temperature in the passenger compartment and/or a measure for the level of personal comfort, which is explained in further detail below. The vehicle may be configured as an omnibus, as illustrated in FIG. 1. The vehicle having the device 1 may however also be configured as a passenger car, as a passenger train or as an aircraft. An aircraft 50, which may incorporate the invention, is illustrated by way of example in FIG. 5.

The temperature determining unit 3 may be structurally integrated in the IR sensor unit 2 or may be provided separately therefrom. In each case, the temperature determining unit 3 receives and processes the measurement data provided by the IR sensor unit. The temperature determining unit 3 may be configured as a microprocessor having a storage device and be embodied in a program-related technical manner in order to process the measurement data provided by the IR sensor unit 2, as is described in this document.

As is evident in FIG. 1, the device 1 or at least the IR sensor unit 2 is arranged in such a manner that its IR cone of view 8 may detect in the best possible manner the passenger or interior compartment 5 that is to be measured. Alternatively, it is also possible to provide multiple IR sensor units 2 of this type that are arranged distributed in the passenger compartment in order to detect respectively different areas of the passenger compartment 5.

The temperature determining unit 3 is configured so as to determine a surface temperature of a predetermined object that is located in the passenger compartment 5 of the vehicle 4. Merely by way of example, it is possible for the object to be a passenger seat 6a, 6b, wherein, in particular, and again merely by way of example, the surface temperature of an outer upper corner of the passenger seat 6a, 6b is determined, since this is generally not concealed by an occupant who is located on the seat.

It is well known from the prior art to determine object temperatures with the aid of an image provided by an IR camera and therefore the procedure is not further described here. However, generally the air temperature in the interior compartment 5 is used as a control variable for the temperature controller. In lieu of now directly using the object temperature as an approximation for the air temperature, in this case the air temperature is determined from the object temperature using a mathematical correlation that has been determined experimentally in advance and that may be stored in the storage device of the temperature determining unit 3. This is further explained in FIG. 2.

Figure 2:
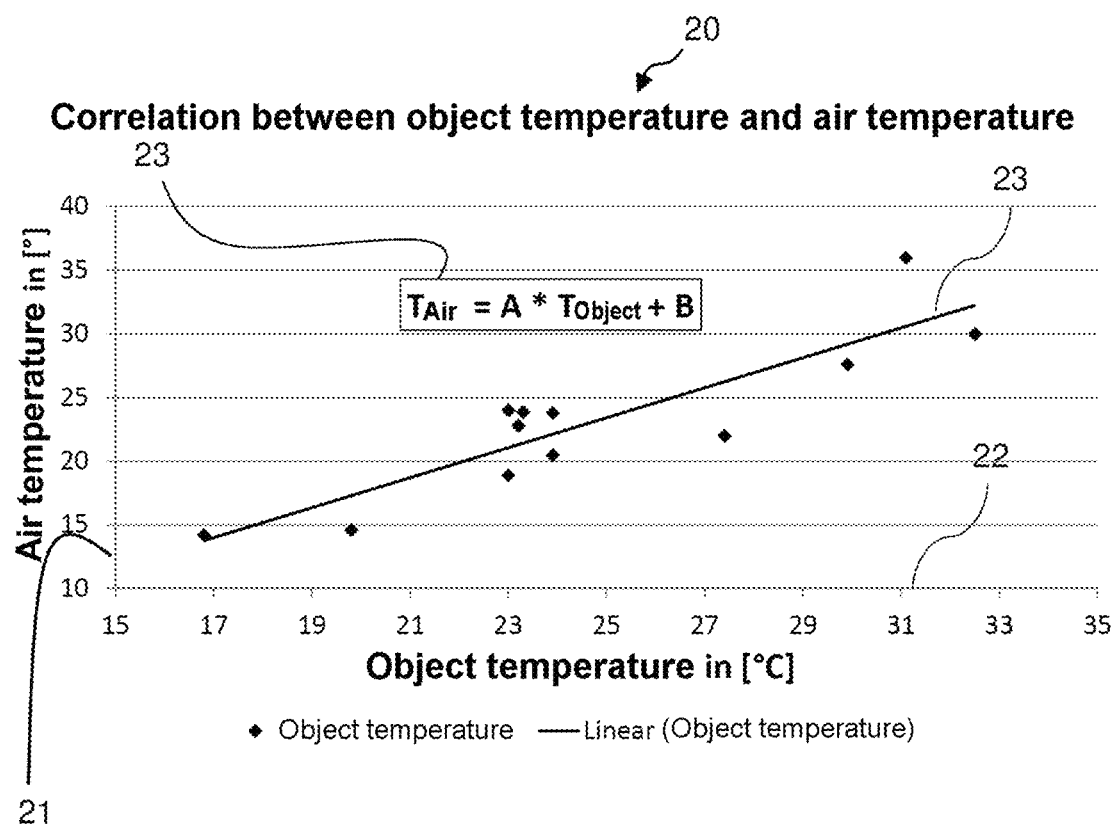
FIG. 2 illustrates the correlation between the object temperature and the air temperature.

FIG. 2 illustrates a mathematical correlation 20 between an object temperature, for example the temperature of a passenger seat 6a, 6b in the area of the upper corner of the seat 7a, also described as object temperature 22, and the air temperature 21 that is in the direct vicinity 11a, 11b thereof, the mathematical correlation being determined with the aid of measurement series and tests. FIG. 2 illustrates a graph of the measurement sites that are determined experimentally and also a regression line that indicates the functional relationship between the object temperature and the air temperature, wherein the incline A and the offset B are determined with the aid of the measurement data.

The air temperature indicates the temperature that is measured at a specified distance from the object. It is also possible to determine different measurement curves and correspondingly functional relationships (regression lines) for different distances. It is then possible to determine the air temperatures at different distances from the measurement object.

Figure 3A:
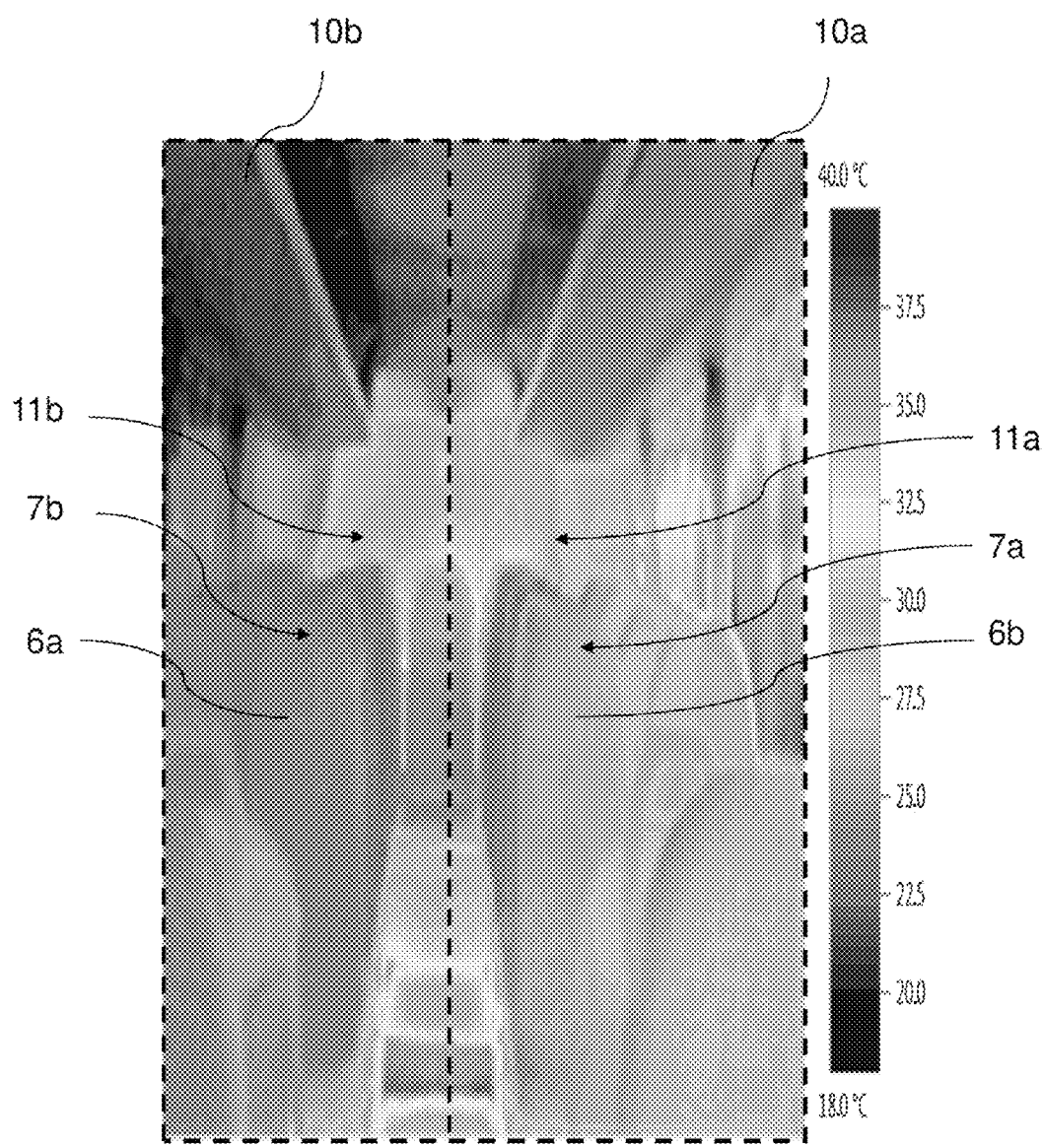
FIG. 3A illustrates an IR image of a passenger compartment having an asymmetrical temperature distribution in accordance with an exemplary embodiment.

This is illustrated in FIG. 3A that illustrates an IR image of a passenger compartment. As may be easily identified with the aid of the IR image, the passenger compartment or rather the passenger cabin comprises an asymmetrical temperature distribution. The right-hand side 10a is brighter, in other words warmer, than the left-hand side 10b as a result of solar radiation on the right-hand side 10a. The temperature determining unit 3 may be configured so as to determine the surface temperatures of predetermined objects 7a, 7b, in other words, the object temperatures, in different areas 10a, 10b of the interior compartment 5 and using the functional relationship 20 or rather the regression lines 23 respectively to determine therefrom air temperatures 21 in the different areas of the passenger compartment, in FIG. 3A by way of example in the areas 11a and 11b. It is possible in this manner to detect inhomogeneities and/or asymmetries of a temperature distribution in the passenger compartment 5. Asymmetries may occur on one side, by way of example, as a result of incoming sunlight. Inhomogeneities may occur as a result of radiation from other heat sources, for example from the engine.

Moreover, the temperature determining unit 3 is configured so as, in dependence upon measurement data provided by the sensor unit 2, to determine a surface temperature 41, preferably a face temperature and/or a hand temperature, for at least one occupant 32 of the passenger compartment. The procedure of determining a face temperature or hand temperature with the aid of an IR camera image is itself also known from the prior art and is therefore not further described here.

Figure 4:
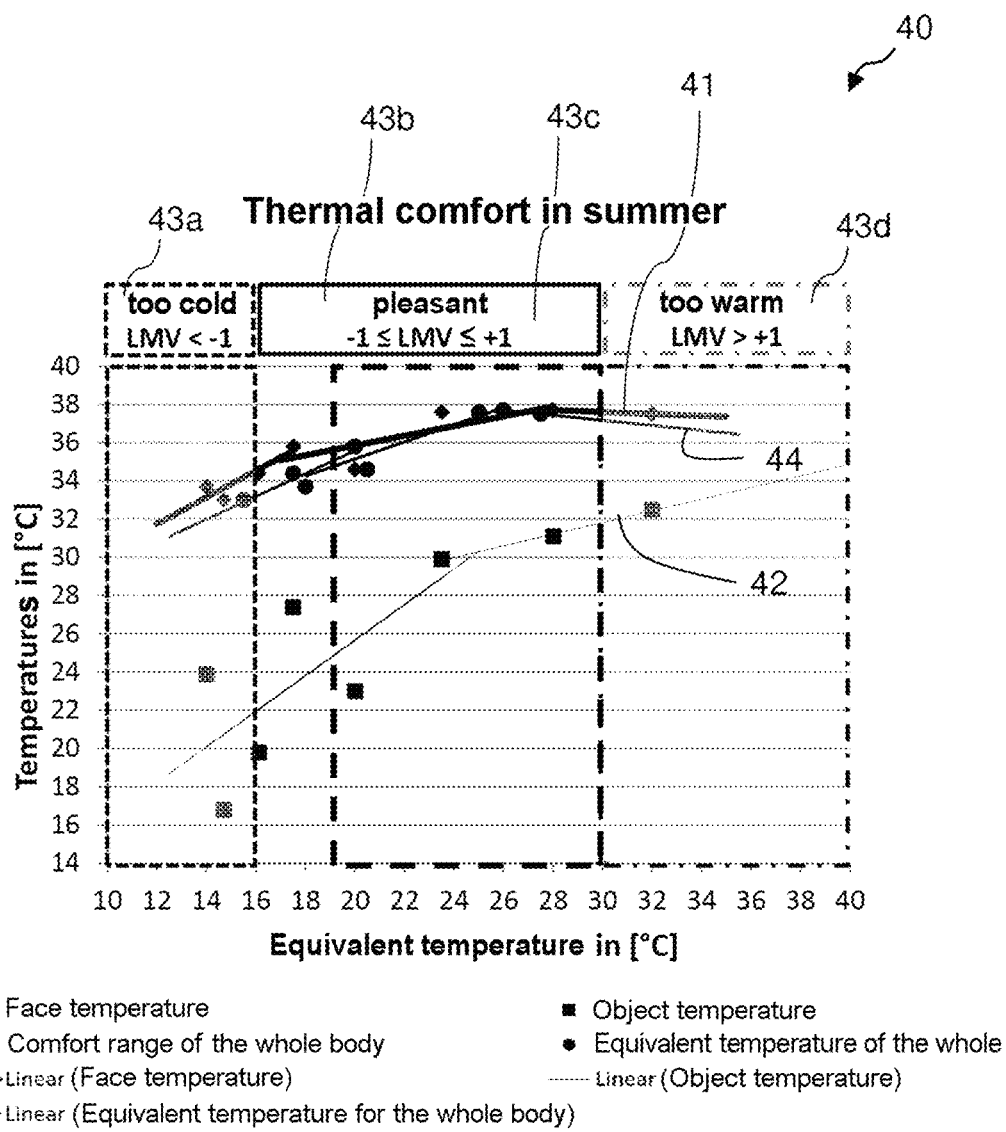
FIG. 4 illustrates the correlation between the face temperature, object temperature and level of personal comfort in accordance with an exemplary embodiment.

The temperature determining unit 3 is, however, configured so as, from the determined surface temperature 41 using a second functional relationship 40, to determine a measurement for the level of personal comfort 43a, 43b, 43c, 43d. This is illustrated schematically in FIG. 4 showing an example of a face temperature that is determined using an IR sensor unit 2. An equivalent temperature is calculated from the face temperature with the aid of a characteristic curve that is determined experimentally in advance. The diamond-shaped measuring sites indicate measurement values of the face temperature; the line 41 indicates the corresponding curve that arises as a result of a regression analysis and is used as a characteristic curve of the equivalent face temperature.

It has already been mentioned above that as an alternative or in addition thereto it is possible to determine a characteristic curve 44 for the equivalent temperature of the whole body, the progression of which is almost identical in the middle temperature range that is considered comfortable but is somewhat different in the outer ranges as has likewise been described above.

In this case, in addition, the surface temperature 42 of an object that is located in the close vicinity of the occupant is determined and used as a correction value for determining the measurement for the level of personal comfort (43a, 43b, 43c, 43d).

The procedure of determining the measurement for the level of personal comfort is based, in particular, on the knowledge that after exceeding a compartment temperature threshold, the face temperature of an occupant no longer or slowly increases in the case of a further increase in the compartment temperature since the occupant is increasingly losing heat by means of sweating. The same applies for very cold temperatures, wherein the surface temperature of an occupant no longer or slowly decreases in the case of a further reduction in the compartment temperature since the occupant attempts to maintain the surface temperature by means of shivering. Consequently, the level of comfort of the occupant varies greatly in the case of high temperatures and in the case of cold temperatures although the skin temperature of an occupant hardly changes. This effect may be measured by taking into consideration the object temperatures 42 that are measured in the vicinity of the occupant, recorded and corrected since in these temperature windows the object temperatures also change differently than the skin temperature since objects neither "sweat" or "shiver."

It is possible by means of experimental measurements using test persons or measurement dolls to quantify these effects in order to determine a corresponding functional relationship 40.

Figure 3B:
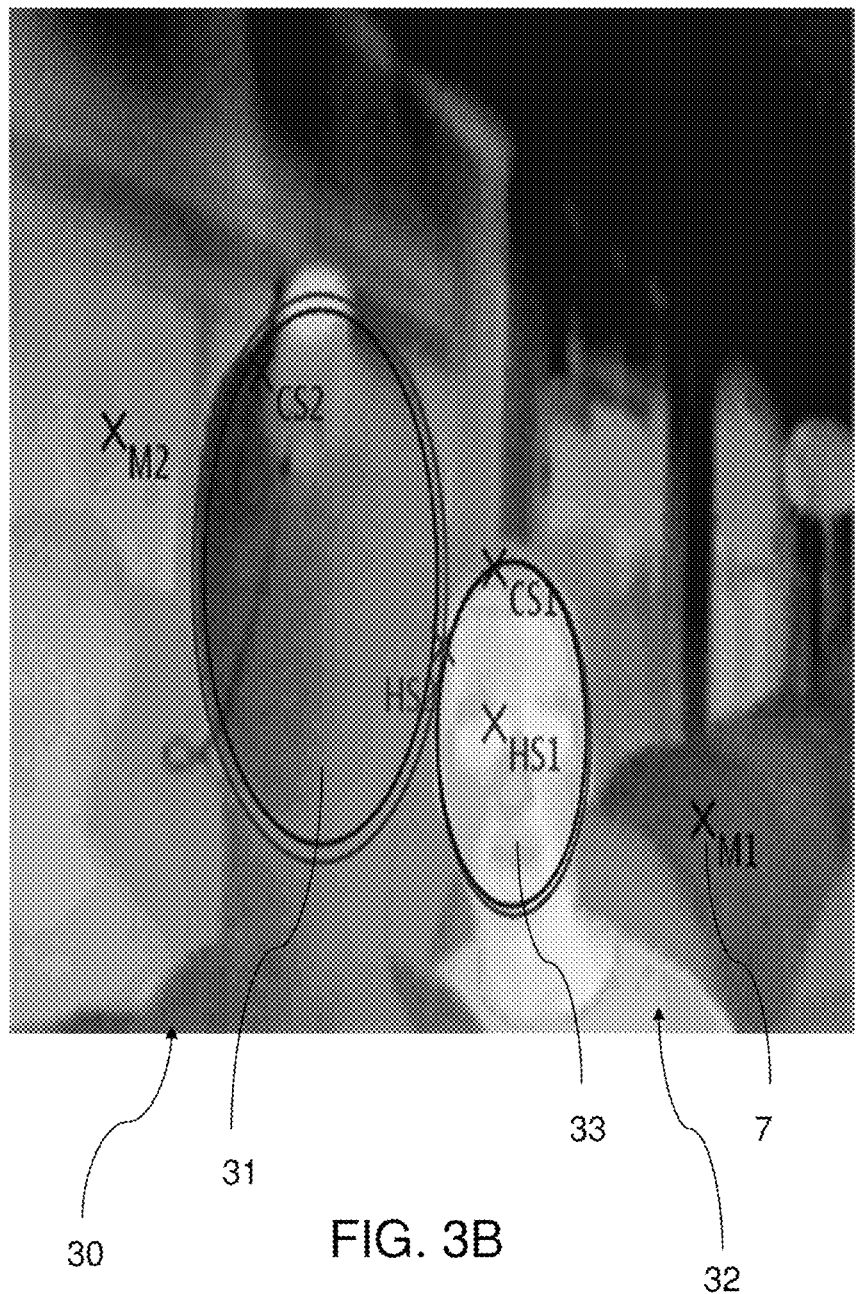
FIG. 3B illustrates an IR image of an exemplary measurement configuration for determining experimentally the second function.

This is illustrated by way of example in FIG. 3B. FIG. 3B illustrates an IR image of an exemplary measurement configuration for determining experimentally the characteristic curve 41 or 44 or rather the second functional relationship. In this case, a measurement doll 30 is placed in the passenger compartment for which the characteristic curve 40 is to be determined and a test person is located as an occupant 32 to the rear of the measurement doll. The measurement doll is provided with multiple sensors in order, in a conventional manner with the aid of the sensor data, to determine an equivalent temperature of the face and/or of the whole body for this measurement doll. Simultaneously, using the IR sensor unit, the passenger compartment, inclusive of the test person who is sitting to the rear or in front of the measurement doll and also an object temperature, is recorded at the upper corner of the seat 7. The reference numerals 31 and 33 refer to the face regions of the measurement doll and the test person that are detected by the image evaluating software of the IR camera and are identified by the encircling outlines. With the aid of this measurement data that is obtained experimentally, it is possible by means of a statistical analysis, for example by means of a regression analysis, to determine the characteristic curve 41 in advance.

Figure 3C:
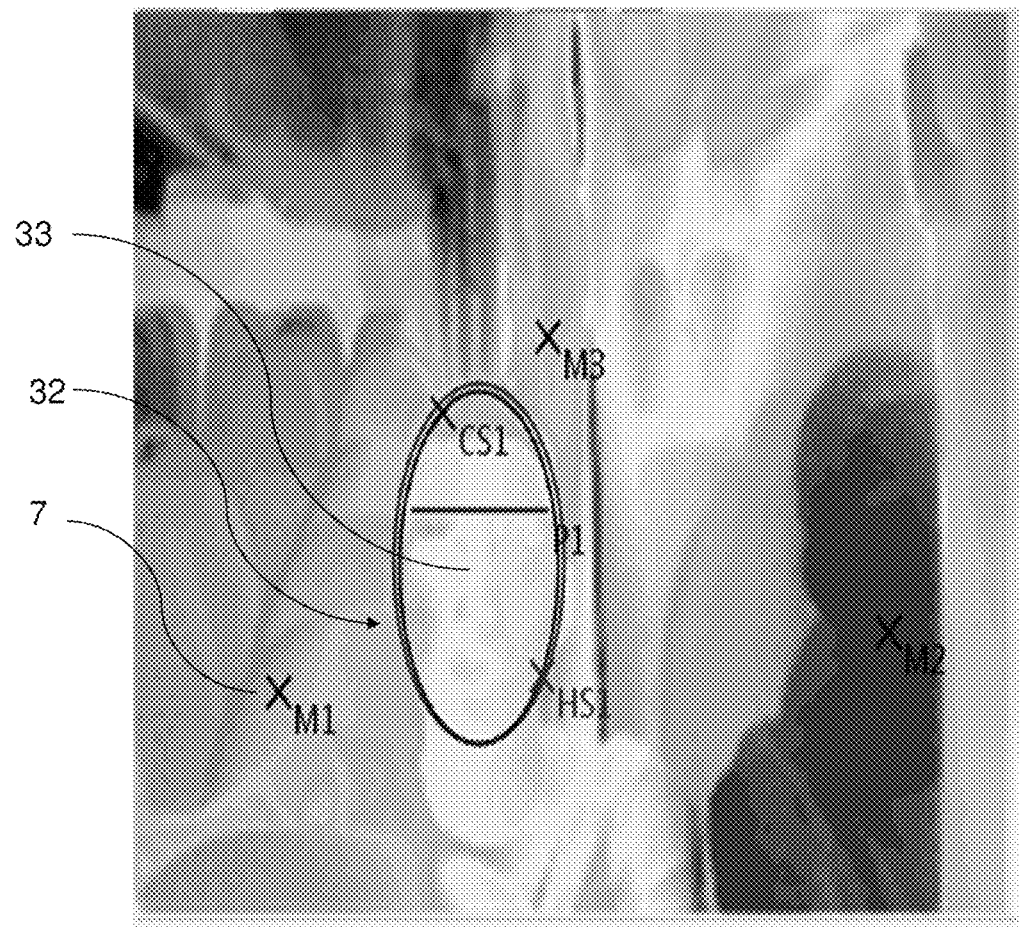
FIG. 3C illustrates an IR image for measuring a face and an object in accordance with an exemplary embodiment.

FIG. 3C illustrates an IR image for measuring a face and an object in accordance with an exemplary embodiment in order then to determine the level of personal comfort of the vehicle occupants using the characteristic curve 41. The image also illustrates a thermal image of an occupant 32, in particular of the face region of an occupant. As may be easily identified with the aid of the IR image, the face temperature of the occupant is higher than the temperature of an upper corner of the seat 7 in the vicinity. With the aid of the characteristic curve 41, it is now possible from the face temperature, which is determined from the IR image, and the object temperature of the corner of the seat, to determine the equivalent face temperature as a measurement for the level of comfort of the occupant.

Accordingly, it is then possible to allocate different levels of personal comfort to the measured face and object temperatures, which is again illustrated in FIG. 4. In the present invention, four stages of: too cold ("LMV<−1") 43a, cold, but pleasant (LMV=−1) 43b, pleasant (−1≤LMV≤+1) to warm 43c, but pleasant (LMV=+1) to too warm (LMV>+1) 43d have been established at a measurement for the level of personal comfort. This classification is however merely by way of example.

The temperature determining unit 3 is configured so as, depending upon the time of year, to use different functional relationships or mathematical correlations 40 in order to determine the level of personal comfort. FIG. 4 illustrates the mathematical correlation 40 that is typical for the conditions which occur in the interior compartment in summer. Accordingly, in a similar manner, mathematical correlations 40 that are used for different times of year are stored in the device 1 in order depending upon the time of year to use the particular mathematical correlation 40 with which it is possible from the skin temperature and object temperature to determine in the most precise manner possible the level of personal comfort.

Accordingly, the functional relationships that are adjusted according to the time of year are determined experimentally for different climatic specifications, in that the climatic conditions for different times of year are simulated experimentally.

The determined air temperatures and levels of personal comfort may then be used as a control variable for the temperature control system 12 of the vehicle in order to adjust the temperature of the passenger compartment of the vehicle accordingly. In this case, the determined air temperatures and levels of personal comfort are used in order to calculate the corresponding control values that are transmitted to a temperature controller 13 for controlling or regulating the compartment temperature of the passenger compartment. In this case, it is possible in a purposeful manner to reduce asymmetries and inhomogeneities of the air temperature and to control the level of personal comfort as desired.

Although the invention has been described with reference to specific exemplary embodiments, it is obvious for the person skilled in the art that different modifications may be performed and equivalents may be used in lieu without departing from the scope of the invention. Consequently, the invention is not to be limited to the disclosed exemplary embodiments but rather is to include all exemplary embodiments that are included in the scope of the attached claims. In particular, the invention also claims protection for the subject matter and the features of the subordinate claims independently from the claims referred to.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Device for determining a temperature
2 Sensor unit, for example IR camera
3 Temperature determining unit
4 Vehicle
5 Passenger compartment
6a, 6b Object, for example vehicle seat
7, 7a, 7b Corner of the seat
8 IR radiation
10a, 10b Part area passenger compartment
11a, 11b Air region in the vicinity of the corner of the seat
12 Temperature control system
13 Temperature controller
20 First functional relationship
21 Air temperature in the vicinity of the object
22 Object temperature
23 Regression line in accordance with a first functional relationship
30 Measurement doll
31 Face region
32 Occupant, test person
33 Face region
40 Second functional relationship
41 Characteristic curve for equivalent face temperature
42 Object temperature
43a-d Range for the level of personal comfort
44 Characteristic curve for the equivalent temperature of the whole body
50 Aircraft

The invention claimed is:

1. A device for determining a temperature in a passenger compartment of a vehicle, said device comprising:
a sensor unit for detecting infrared radiation; and,
a temperature determining unit configured so as, in dependence upon measurement data provided by the sensor unit, to determine a surface temperature of a predetermined object located in the passenger compartment of the vehicle, and from the determined surface temperature of the object using a first functional relationship, to determine an air temperature in the passenger compartment of the vehicle,
wherein the temperature determining unit is further configured so as, in dependence upon the measurement data provided by the sensor unit, to determine a surface temperature for at least one occupant of the passenger compartment, and, from the determined surface temperature of the at least one occupant using a second functional relationship, to determine a measurement for a level of personal comfort,
wherein, so as to determine the measurement for the level of personal comfort, an equivalent temperature of at least one of a face or of a whole body of the at least one occupant is determined, and
wherein the temperature determining unit is further configured so as, using a correction value, to take into consideration at least one or more of an effect according to which;
in a case of an increase in a compartment temperature, after the exceeding a first compartment temperature threshold, the surface temperature of the at least one occupant no longer increases or slowly increases since the at least one occupant increasingly loses heat by means of sweating; or
in a case of a reduction in the compartment temperature, after falling below a second compartment temperature threshold, the surface temperature of the at least one occupant no longer decreases or slowly decreases since the at least one occupant increasingly creates heat by means of shivering.

2. The device as claimed in claim 1, wherein the temperature determining unit is configured so as to detect at least one of inhomogeneities or asymmetries of a temperature distribution in the passenger compartment to determine the surface temperatures of predetermined objects in different areas of the passenger compartment, and, using the first functional relationship, to determine therefrom respective air temperatures in the different areas of the passenger compartment.

3. The device as claimed in claim 1, wherein the temperature determining unit is configured so as, in dependence upon the measurement data of the sensor unit, to determine a surface temperature of an object that is located in a close vicinity of the at least one occupant, and to use the surface temperature of the object located in the close vicinity of the at least one occupant as the correction value for determining the measurement for the level of personal comfort.

4. The device as claimed in claim 1, wherein the second functional relationship further comprises a correction variable for which different values are established depending upon a time of year.

5. The device as claimed in claim 1, wherein the device is configured so as, in dependence upon the measurement data provided by the sensor unit, to determine a number of occupants in the vehicle.

6. The device as claimed in claim 5, wherein the temperature determining unit is configured so as, in dependence upon the determined number of occupants, to determine the measurement for the level of personal comfort for a plurality of occupants.

7. The device as claimed in claim 6, wherein the temperature determining unit is configured to determine the measurement for the level of personal comfort for all occupants.

8. The device as claimed in claim 1, wherein the sensor unit for detecting infrared radiation comprises at least one of an IR camera or a thermal imaging camera.

9. The device as claimed in claim 1, wherein the determined surface temperature of the at least one occupant is at least one of a face temperature or a hand temperature.

* * * * *